(12) United States Patent
Selanders et al.

(10) Patent No.: US 12,729,803 B2
(45) Date of Patent: Sep. 8, 2026

(54) MODULAR LOAD PADS

(71) Applicant: Origen RV Accessories, Ltd., Calgary (CA)

(72) Inventors: Mark Jeffrey Selanders, Langdon (CA); Russell J. Johnson, Greenville, TN (US); Devon Wilson, Calgary (CA)

(73) Assignee: Origen RV Accessories, Ltd., Calgary (CA)

(*) Notice: Subject to any disclaimer, the term of this patent is extended or adjusted under 35 U.S.C. 154(b) by 0 days.

(21) Appl. No.: 18/671,734

(22) Filed: May 22, 2024

(65) Prior Publication Data

US 2025/0361974 A1 Nov. 27, 2025

(51) Int. Cl.
*B65D 19/00* (2006.01)
*F16M 11/22* (2006.01)

(52) U.S. Cl.
CPC .................................. *F16M 11/22* (2013.01)

(58) Field of Classification Search
CPC ........ F16M 11/22; F24F 13/32; F24F 13/222; B65D 19/38
USPC .......... 248/500, 678, 346.01, 346.02, 346.03
See application file for complete search history.

(56) References Cited

U.S. PATENT DOCUMENTS 3,696,761 A * 10/1972 Brown .................. B65D 19/38 108/56.1
4,023,755 A * 5/1977 Alesi, Jr. .................. H02B 7/06 336/65
4,042,108 A * 8/1977 Brethauer .............. B65D 71/70 206/509
4,674,414 A * 6/1987 Nulle .................. B65D 19/004 108/901
4,890,743 A * 1/1990 Powel .................... B65D 71/70 206/595
5,142,994 A * 9/1992 Sandberg ............ B65D 19/004 428/106
5,341,748 A * 8/1994 Liu ....................... B65D 19/40 108/53.3
5,415,109 A * 5/1995 McBride ............ B65D 19/0002 108/57.29
5,755,162 A * 5/1998 Knight ............... B65D 19/0012 108/901
5,758,855 A * 6/1998 Jordan ............... B65D 19/0036 156/196
5,791,262 A * 8/1998 Knight ............... B65D 19/0012 108/57.25
5,887,529 A * 3/1999 John .................. B65D 19/0018 108/57.33
5,921,188 A * 7/1999 Kohlhaas ........... B65D 19/0075 108/52.1
6,164,214 A * 12/2000 Smorgon ........... B65D 19/0016 108/53.5
6,289,823 B1 * 9/2001 Koefelda ........... B65D 19/0018 108/53.3
6,343,439 B1 * 2/2002 Rutledge ................ F24F 13/32 248/148
6,769,367 B2 * 8/2004 Schutz ................ B65D 19/004 108/51.11

(Continued)

*Primary Examiner* — Nkeisha Smith
(74) *Attorney, Agent, or Firm* — ArentFox Schiff LLP

(57) ABSTRACT

A load pad device may include a top apparatus with a substantially flat upper surface and a center apparatus configured to removably connect to a bottom surface of the top apparatus. The load pad device may further include a bottom apparatus connected to the center apparatus.

12 Claims, 7 Drawing Sheets

(56) References Cited

U.S. PATENT DOCUMENTS

| | | | | |
|---|---|---|---|---|
| 7,490,561 | B1 * | 2/2009 | Chou | B65D 19/0095 108/56.1 |
| 8,347,794 | B2 * | 1/2013 | Muirhead | B29C 48/91 340/505 |
| 9,464,452 | B2 * | 10/2016 | Higgs | E04H 12/2238 |
| 9,923,351 | B2 * | 3/2018 | Beckhart | H02G 3/30 |
| 10,414,541 | B2 * | 9/2019 | Kroeker | B65D 19/0018 |
| 10,926,918 | B2 * | 2/2021 | White | B65D 19/0073 |
| 10,962,256 | B1 * | 3/2021 | Xu | F24F 13/32 |
| 11,174,070 | B2 * | 11/2021 | Kalinowski | B65D 19/0018 |
| 11,685,583 | B2 * | 6/2023 | Clark | B65D 21/0224 248/346.02 |
| 11,708,192 | B2 * | 7/2023 | Reali | B65D 19/0051 108/50.11 |
| 2001/0029874 | A1 * | 10/2001 | Muirhead | B65D 19/0012 108/57.25 |
| 2002/0148393 | A1 * | 10/2002 | Milles | B65D 19/0018 108/53.1 |
| 2004/0134390 | A1 * | 7/2004 | Apps | B65D 19/38 108/53.1 |
| 2007/0277706 | A1 * | 12/2007 | Carter | B65D 19/0028 108/57.15 |
| 2010/0251941 | A1 * | 10/2010 | Muirhead | G06F 21/554 108/51.11 |
| 2013/0032507 | A1 * | 2/2013 | Du Toit | B65D 19/0012 206/599 |
| 2014/0020234 | A1 * | 1/2014 | Luis y Prado | F16M 11/00 29/592 |
| 2015/0108037 | A1 * | 4/2015 | Evans | B65D 19/18 108/50.11 |
| 2023/0255383 | A1 * | 8/2023 | Ben Amor | A47B 91/12 248/346.01 |
| 2023/0348135 | A1 * | 11/2023 | Reinhart | B65D 19/00 |
| 2024/0286795 | A1 * | 8/2024 | Reali | B65D 19/0051 |
| 2025/0026532 | A1 * | 1/2025 | Blanchard | B65D 19/0016 |
| 2025/0042609 | A1 * | 2/2025 | Kujawa | B65D 19/0028 |

* cited by examiner

MODULAR LOAD PADS

TECHNICAL FIELD

Aspects of the disclosure relate generally to improved load pads distributing loads.

BACKGROUND

Typical recreational vehicles, motor homes, recreational vehicle transporting trailers, and travel trailers, are equipped with electric, hydraulic, and/or mechanical jacks which are lowered to the ground to lift or support the vehicle, trailer, or trailer tongue (i.e., the portion of the trailer that connects to the towing vehicle). The jacks allow the trailer to be installed on a towing vehicle, allow for storage of the vehicle, and/or provide a stable, comfortable, level, working or living environment.

The ground below the vehicle jack may vary from gravel pads, concrete or asphalt, and soft surfaces such as grass or sand. The portion of the jack, such as a jack base, that interacts with the ground below can damage such surfaces due to the force applied to the ground when the vehicle/trailer is being supported and/or is being leveled. Sinking of the jack base into the surface on which leveling, or support is attempted not only damages the surface, but also poses a safety hazard to the user. For example, the sinking of the landing foot may cause difficulty or safety concerns with installing the vehicle onto the towing vehicle. In addition, it may be necessary to level the vehicle so that that equipment such as refrigerators and gas stoves inside the vehicle operates more efficiently and safely and/or so occupants in the vehicle experience a level living environment.

In the scaffolding industry or in other industries, wheels such as caster wheels, scaffolding legs, and/or supports may concentrate loads over a small surface area to the ground below and can damage surfaces. Sinking of the wheel or support into the surface on which support is attempted may not only damage the surface but may also pose a safety hazard.

SUMMARY

The following presents a simplified summary of one or more aspects of the technology disclosed herein in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In some aspects of the disclosure, a load pad for distributing a load is described. The load pad including: a top apparatus with a substantially flat upper surface; a center apparatus configured to removably connect to a bottom surface of the top apparatus; and a bottom apparatus connected to the center apparatus.

In some aspects of the disclosure, load pad systems are described. The load pad system may include a plurality of load pads, wherein each load pad of the plurality of load pads includes: a top apparatus with a substantially flat upper surface; a center apparatus configured to removably connect to a bottom surface of the top apparatus; and a bottom apparatus connected to the center apparatus.

In some aspects of the disclosure, methods of forming a load pad are described, the method including: forming a top apparatus with a substantially flat upper surface; forming a center apparatus configured to removably connect to a bottom surface of the top apparatus; and forming a bottom apparatus connected to the center apparatus, wherein the center apparatus is formed of a material that has a higher rigidity that the top apparatus and the bottom apparatus.

To the accomplishment of the foregoing and related ends, the one or more aspects of the disclosure comprise the features hereinafter fully described and particularly pointed out in the claims. The following description and the annexed drawings set forth in detail include certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

Features characteristic of aspects if the technology described herein are set forth as follows, in the appended claims, and in the drawings. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative aspects when read in conjunction with the accompanying drawings.

DETAILED DESCRIPTION

Figure 1:
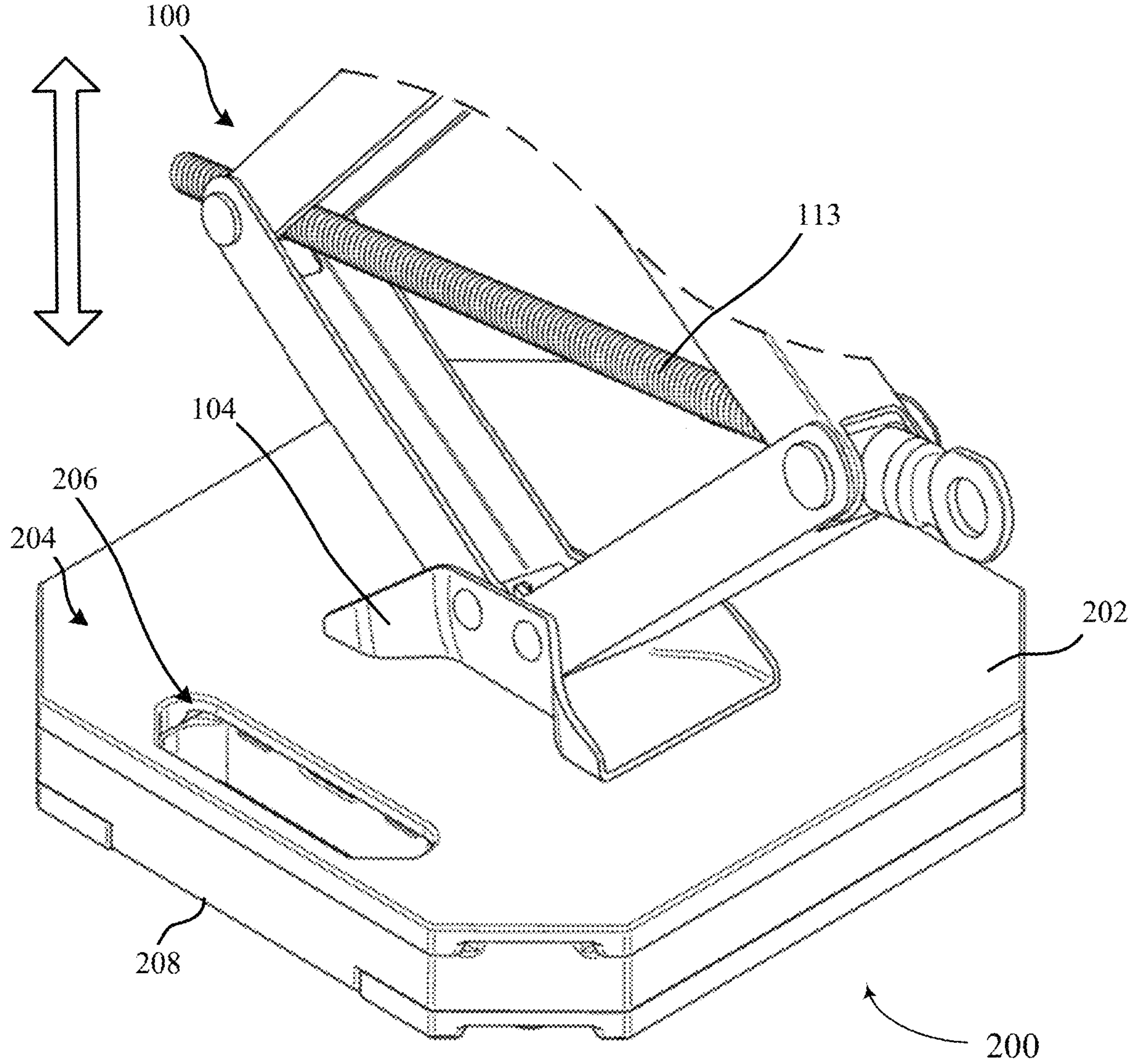
FIG. 1 illustrates an example load pad with an example jack supported thereon according to one aspect of the disclosure.
Figure 2:
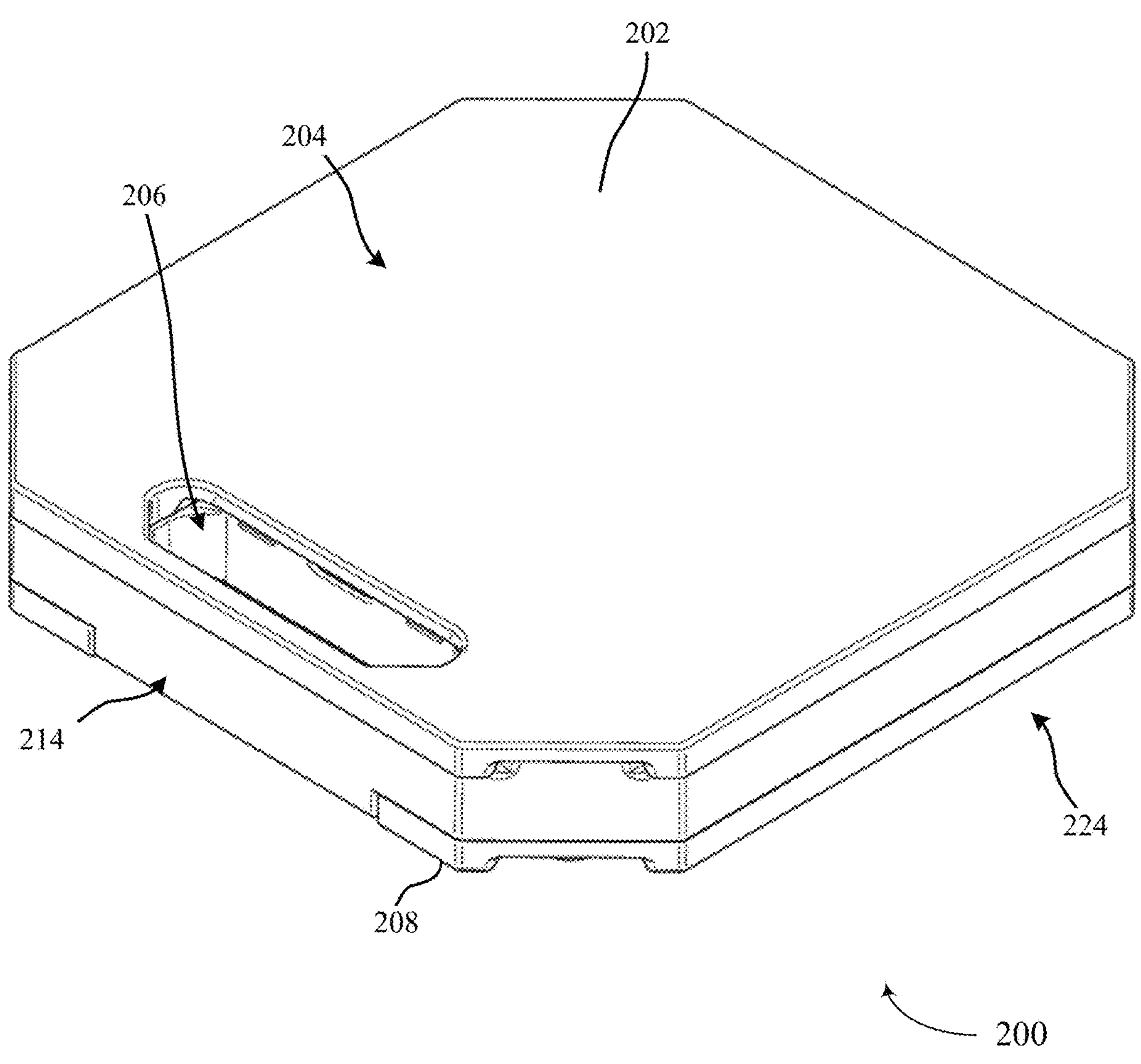
FIG. 2 illustrates a perspective view of the load pad of FIG. 1 according to one aspect of the disclosure.

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well known structures and components are shown in block diagram form in order to avoid obscuring such concepts.

TERMINOLOGY

Reference throughout this specification to one aspect, an aspect, one example or an example means that a particular feature, structure or characteristic described in connection with the embodiment or example may be a feature included in at least example of the present disclosure. Thus, appearances of the phrases in one aspect, in an aspect, one example or an example in various places throughout this specification are not necessarily all referring to the same example. Furthermore, the particular features, structures or characteristics may be combined in any suitable combinations and/or subcombinations in one or more embodiments or examples.

Throughout the disclosure, the terms substantially or approximately may be used as a modifier for a geometric relationship between elements or for the shape of an element or component. While the terms substantially or approximately are not limited to a specific variation and may cover any variation that is understood by one of ordinary skill in the art to be an acceptable level of variation, some examples are provided as follows. In one example, the term substantially or approximately may include a variation of less than 10% of the dimension of the object or component. In another example, the term substantially or approximately may include a variation of less than 5% of the object or component. If the term substantially or approximately is used to define the angular relationship of one element to another element, one non-limiting example of the term substantially or approximately may include a variation of 5 degrees or less. These examples are not intended to be limiting and may be increased or decreased based on the understanding of acceptable limits to one of skill in the relevant art.

For purposes of the disclosure, directional terms are expressed generally with relation to a standard frame of reference when the aspects or articles described herein are in an in-use orientation. In some examples, the directional terms are expressed generally with relation to a left-hand coordinate system.

Terms such as a, an, and the, are not intended to refer to only a singular entity, but also include the general class of which a specific example may be used for illustration. The terms a, an, and the, may be used interchangeably with the term at least one. The phrases at least one of and comprises at least one of followed by a list refers to any one of the items in the list and any combination of two or more items in the list. All numerical ranges are inclusive of their endpoints and non-integer values between the endpoints unless otherwise stated.

The terms first, second, third, and fourth, among other numeric values, may be used in this disclosure. It will be understood that, unless otherwise noted, those terms are used in their relative sense only. In particular, certain components may be present in interchangeable and/or identical multiples (e.g., pairs). For these components, the designation of first, second, third, and/or fourth may be applied to the components merely as a matter of convenience in the description.

As used herein, the term vehicle refers to any type of conveyance moving on wheels including, but not limited to, a recreational vehicle such as, for example, a camper, trailer, fifth wheel, toy hauler, or motor home.

As used herein, the term support surface refers to a surface upon which the vehicle or other load is applied, but not limited to, even and uneven surfaces such as, for example, asphalt, concrete, rock, sand, gravel, ground, soil, vegetation, grass, commercial or residential flooring, and the like.

OVERVIEW

Recreational vehicles, motor homes, recreational vehicle transporting trailers, and travel trailers, are typically equipped with electric, hydraulic, and/or mechanical jacks (referred to broadly throughout this disclosure as a "jack"), which are lowered to the ground to lift or support the trailer to allow the trailer to be installed on a vehicle, to store the trailer, and/or to provide a stable, comfortable, level living environment. One example of a vehicle jack is located at or near a trailer tongue and or near the wheels or corners of a trailer to support and/or adjust the height of a relevant portion of a trailer. The vehicle jack may have a jack base that is typically configured to contact the ground. Since the ground below the vehicle jack and jack base may vary, the current disclosure provides examples of a modular load pad and load pad system that is can be configured or stacked to provide a secure footing to prevent unwanted movement of the jack base and/or to prevent the jack base from sinking into the ground and/or damaging the surface below the jack base. The load pad and load pad system disclosed herein is also usable with any type of concentrated load or force, for example a leg or post of a scaffolding, ladder, or other support to name some additional non-limiting examples. In other examples, a load pad or system of load pads may be used as drive-on surfaces for leveling a vehicle and/or to raise a vehicle for access to the undercarriage of the vehicle. The load pad or system of load pads may further be used in farm, agricultural, landscape, or other industries that may require increased stability and/or to prevent floor or ground damage. The load pad or system of load pads may also be used as outriggers on manlifts for increased stability and/or to prevent floor or ground damage. The load pad or system of load pads may further be used in off-road or low traction scenarios to improve traction over a slick surface. The load pad or system of load pads may also be used as a base for a Hi-Lift® jack or farm jack to name a few additional non-limiting examples, uses, and advantages.

This overview, and the detailed description that follows, has been presented for purposes of illustration and description. It is not intended to be exhaustive nor to limit the disclosure to the forms described. Numerous modifications are possible considering the teachings herein, including any combination of the different examples described herein. Some of those modifications have been discussed and others will be understood by those skilled in the art. The various aspects were chosen and described to best illustrate the principles of the present disclosure and various aspects as are suited to the particular use contemplated. The scope of the present disclosure is, of course, not limited to the examples or aspects set forth herein but can be employed in any number of applications and equivalent devices by those of ordinary skill in the art. Rather, it is hereby intended the scope be defined by the claims appended hereto.

DETAILED EXAMPLES

The present disclosure relates to load pad, and a series or system of load pads, and method of making load pads with interlocking components. The components and operation of vehicle jacks are commonly known to those skilled in the art and will not be discussed in detail. In general, the jack may be hydraulically or mechanically operated, in some instances manually be a user. In other instances, the user may be provided with a control panel such as for example, a switch panel, for operating the jack. Typical electric, hydraulic, and/or mechanical jacks are capable of being extended downwardly from the underside of the vehicle towards an underlying support surface to support the vehicle, level the vehicle, and/or for raising the vehicle for hook-up to a towing vehicle. Typically, when the vehicle is to be towed and/or driven or otherwise mobilized again, the jack feet are retracted upwardly towards the underside of the vehicle and may be folded-up, allowing the vehicle to be towed and/or for the vehicle to drive-off.

FIG. 1 illustrates a partial view of an adjustable jack 100. In some examples, the jack 100, can typically support a weight or load. The jack shown in FIG. 1 may be referred to in the art as a "scissor jack." Application of a rotation force to the shaft causes the jack to move upwards or downwards as indicated by the arrows in FIG. 1. The shaft 113 may be rotated manually by a user, by a hand operated drill or impact wrench and/or may have a motor connected thereto to allow for automated operation thereof. It is noted that while a scissor type jack is shown, the disclosed aspects are applicable to other known jacks as well. Another non-limiting version of a jack usable with aspects of the disclosure is a tongue jack without a base or foot on it (e.g., partial tongue jack 700 shown in FIG. 7).

As shown in FIG. 1, the jack 100 may further include a jack base 104 that is connected to the links, as noted above, the jack base may be a source of concentrated load, which may be problematic when the ground beneath the jack is soft and/or easily damaged. Further, in some situations the ground underneath the jack base 104 may be uneven and/or the jack may not be capable of extending far and/or fast enough when leveling of the vehicle or load. A load pad 200, shown as an example of the disclosed features herein, increases a surface contact patch when compared to the jack base 104 and isolates the jack base from a ground or surface. Thus, a contact area with the surface is increased which spreads the load that would typically be applied over a smaller contact area between the jack base 104 and a support surface. Further, the load pad 200 may be formed of a rigid core with a flexible or semi-flexible material which provides cushioning that may at least partially conform to the load surface and thus may stabilize the load supported by the jack 100, especially on soft and/or uneven surfaces.

Turning to FIGS. 2-4B, a load pad 200, may have a top apparatus 204, a base apparatus 224 and a center apparatus 214. In some examples the center apparatus may be formed of a material that is more rigid than the top apparatus 204 and/or the base apparatus 224. For example, the center apparatus 214 may be formed of any or combination of Polycarbonate, ABS Plastic, High Density Polyethylene (HDPE) and Polypropylene, and the like to name a few non-limiting examples. Such materials are durable, lightweight, and relatively inexpensive.

Any one of or both of the top apparatus 204 and/or the base apparatus 224 may be formed of a from a flexible, clastic material having sufficient strength and ruggedness to support the weight of a vehicle and withstand use, to increase resistance to slip, and to conform to uneven underlying support surfaces. The term "flexible" may include materials that are capable of bending without breaking or plastically or permanently deforming. As used herein, the term "elastomer" means a material which exhibits the property of elasticity, namely the ability to deform when a stress is applied and to recover its original form (i.e., length, volume, shape, etc.) spontaneously when the stress is removed. Elastomers typically have a low Young's modulus (i.e., the ratio of tensile stress to tensile strain, expressed in units of pressure), and a high yield strain (i.e., the stress at which a material begins to deform plastically, expressed in units of pressure). Suitable elastomeric materials may include, but are not limited to, high friction, low tack materials such as, for example, crumb rubber, natural rubber, plastic materials, elastomerics, thermoplastic polyurethane (TPU) and the like.

Figure 3:
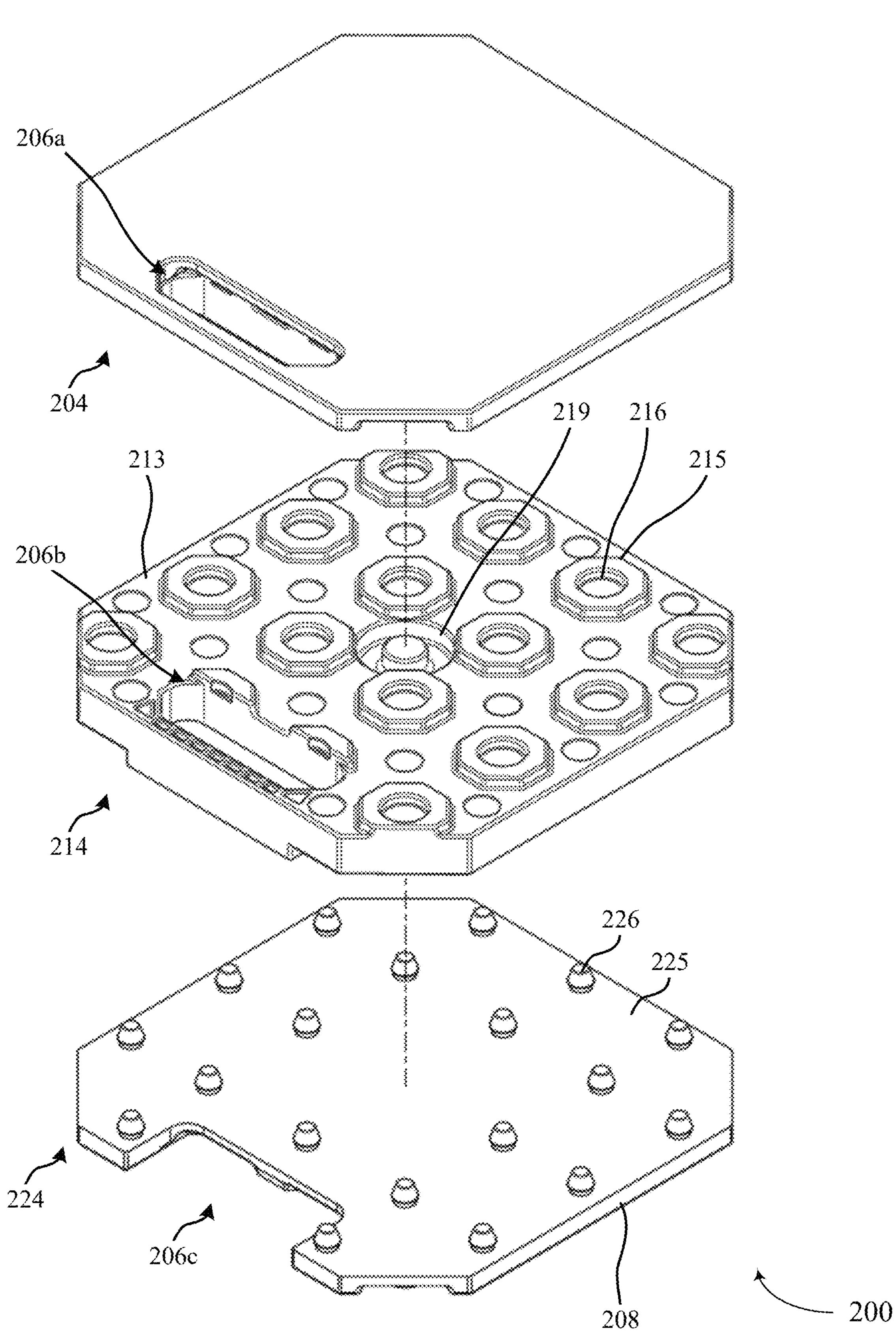
FIG. 3 illustrates a perspective view of the load pad of FIGS. 1 and 2 with a top apparatus, middle apparatus, and bottom apparatus in a separated state.

The top apparatus 204, may for example have a top surface 213 and may be configured to engage with or otherwise be removeably connected to the center apparatus 214. Similarly, the base apparatus 224 may be configured to engage with or otherwise be removably connected to the center apparatus 214. The center apparatus 214 may have a series of top engagement features. As shown in the example of FIG. 3, the top engagement features may be a protrusion 215. It is noted that while a single protrusion 215 is referenced in FIG. 3, the center apparatus 214 may have multiple protrusions. The example of FIG. 3 includes sixteen (16) protrusions. It is noted that more or less protrusions may be implemented without departing from the scope of the disclosure. For example, the center apparatus 214 may include anywhere from one (1) to sixty (60) protrusions. In another example, the center apparatus 214 may include anywhere from eight (8) to twenty-eight (28) protrusions.

Any one or combination of the protrusions 215 may include a concave center portion 216. The concave center portion 216 may further ensure that the center apparatus 214 and the top apparatus 204 remain consistently engaged by increasing the engagement surface area and/or by providing a slip fit or interference fit with protrusions on the bottom of the top apparatus 204 as discussed in further detail below.

In one aspect of the disclosure, the side walls of each protrusion 215 are arranged in a generally octagonal configuration. Compared to a round configuration, an octagonal configuration may provide more consistent engagement surface area and/or provide a more constant slip fit or interference fit with concave portions of the top apparatus 204 that are configured to have the protrusions fit therewithin. While an octagonal configuration is depicted, it will be appreciated by those skilled in the art that other shapes such as for example, circular, oval, square, rectangular, hexagonal, heptagonal, nonagonal, decagonal, and the like, are included within the scope of the disclosure.

The bottom surface of the center apparatus 214 may include a plurality of engagement openings or features 220. The engagement openings or features may for example be opening configured to captively receive engagement protrusions 226 that protrude from the top surface 225 of the base apparatus 224. It is noted that while a single engagement opening 220 and single protrusion 226 is referenced in FIG. 3 and FIG. 4A, the base apparatus 224 may have multiple protrusions and the center apparatus 214 may have multiple engagement openings 220 that correspond with and are configured to captively engage with the engagement protrusions 226. The example of FIG. 3 and FIG. 4A includes nineteen (19) protrusions 226 and nineteen (19) engagement openings 220. It is noted that more or less protrusions and/or engagement openings 220 may be implemented without departing from the scope of the disclosure. For example, the center apparatus 214 and/or the base apparatus 224 may include anywhere from one (1) to seventy (70) protrusions and corresponding engagement openings. In another example, the base apparatus 224 may include anywhere from twelve (12) to thirty-six (36) protrusions and corresponding engagement openings.

In order to retain the engagement protrusions 226 within the engagement openings 220, the protrusions 226 may have retaining features that are angular and/or lipped. In one aspect, a horizontally extending lip (i.e., so each protrusion has a diameter that gradually increases and then decreases again at a location closer to the top surface 225 of the base apparatus 224) grips an inner surface of the corresponding engagement opening 220 upon insertion, which can result in a secure fit. When this fit occurs, each one of the engagement protrusions 226 can be securely held within each respective engagement opening 220. The aforementioned configuration can retain the base apparatus 224 to the center apparatus 214 while still allowing the base apparatus 224 to be removable from the center apparatus 214 if enough removal force is applied by a user. The aforementioned configuration, in combination with the aspects described herein, may further improve the versatility of the system and allows a user to remove the base apparatus 224 if needed, for example if the center apparatus 214 and/or base apparatus 224 requires replacement or if a certain scenario requires separation of the two during use.

Figure 4A:
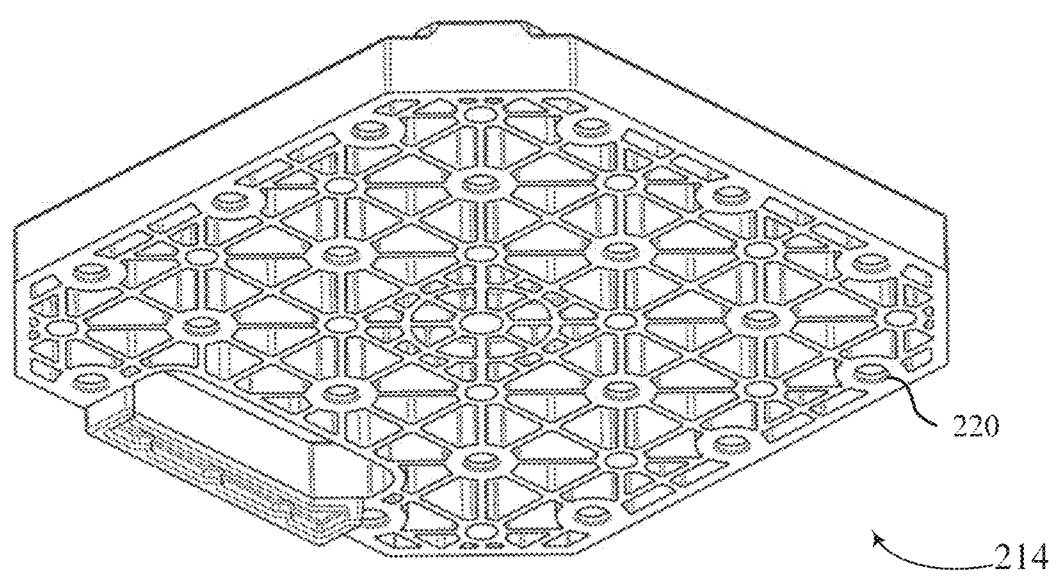
FIG. 4A illustrates a bottom perspective view of the middle apparatus of FIGS. 1-3.

It is noted that while round engagement openings 220 and engagement protrusions 226 are shown in FIG. 3 and FIG. 4A, any protrusion and/or corresponding engagement openings 220 may instead have an octagonal configuration. While a round configuration is depicted, it will be appreciated by those skilled in the art that other shapes such as for example, oval, square, rectangular, hexagonal, heptagonal, nonagonal, decagonal, and the like, are included within the scope of the disclosure.

Further, if desired, base apparatus 224 and the center apparatus 214 can be permanently attached. In one aspect, one or more adhesives may be used to attach the base apparatus 224 and the center apparatus 214 permanently. Suitable adhesives may include, but are not limited to, liquid adhesives, glues, two-sided tape, and the like. In one aspect, one or more the base apparatus 224 and the center apparatus 214 may be permanently mechanically attached via one or more permanent mechanical attachment features.

Turning to FIG. 4A, the center apparatus 214 may be formed with a lattice or semi-hollow bridged construction with a plurality of openings and support portions for distributing loads and forces from the top apparatus 204 (if applicable) to the base apparatus 224, and ultimately to the ground or floor or another load pad 200 in contact with a bottom surface of the base apparatus 224 (as described below with respect to FIGS. 5 and 6). The hollow or semi-hollow league or bridged construction can allow the load pad 200 to remain lightweight while still providing a robust and stable structure for the handling of various loads that may be encountered while using the load pad 200.

The center apparatus 214 may further include a handle portion 206*b*, which may for example be an opening that corresponds with similarly shaped openings in the top apparatus 204 and the base apparatus 224.

Figure 7:
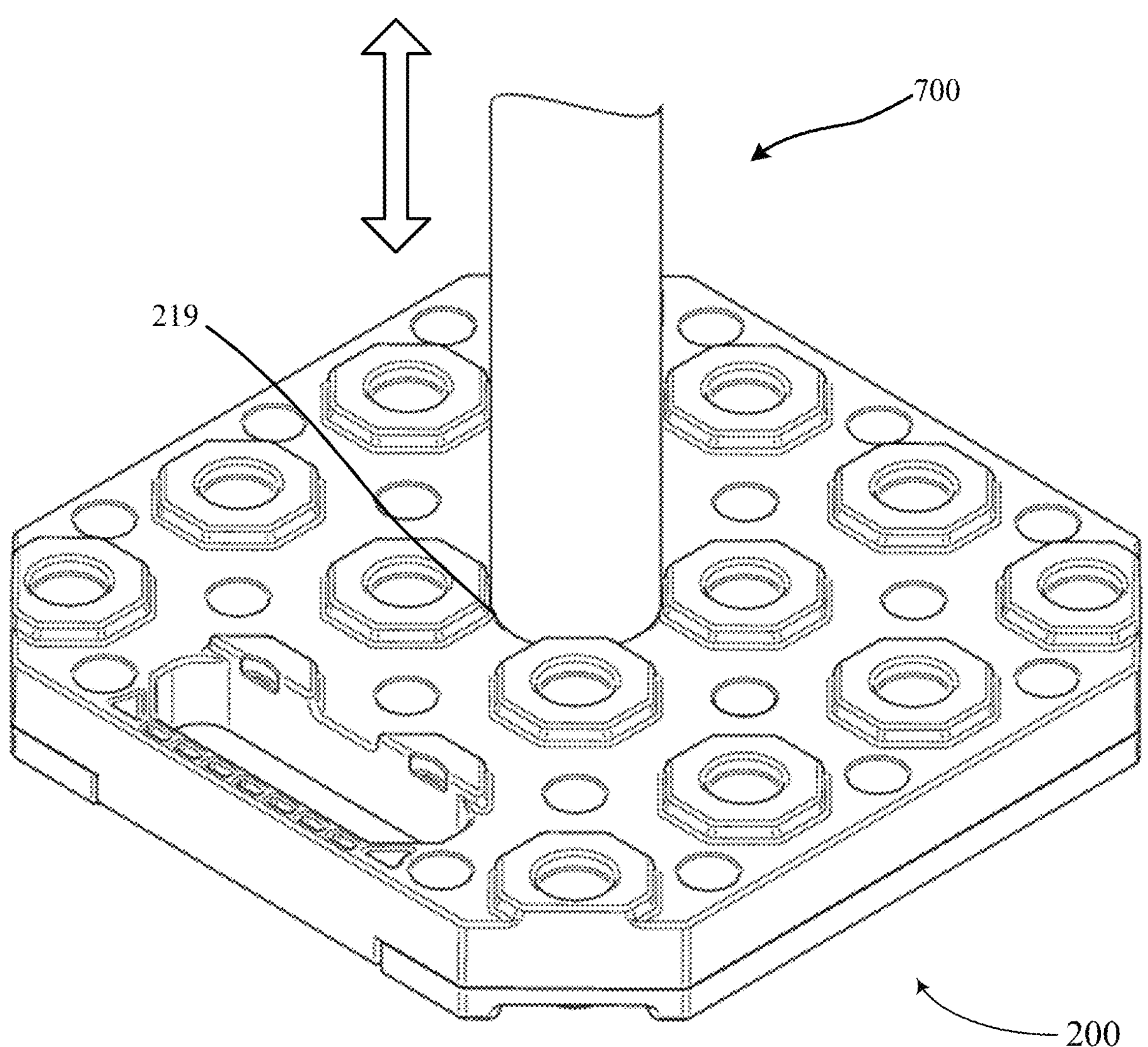
FIG. 7 illustrates a perspective view of a load pad with an example load supported thereon according to aspects of the disclosure.

Turning to FIG. 3, the center apparatus 214 may further include a jack or leg engagement feature 219. As shown in FIGS. 3 and 7. The jack or leg engagement feature 219 may be concave shaped and dimensioned to or otherwise configured to receive a portion of a leg or tongue jack 700. The jack or leg engagement feature 219 provides additional versatility to the load pad 200, and increases the stability of a leg or jack 700 while distributing the load applied by the leg or jack 700 over a wider surface area. As shown in FIG. 7, the top apparatus 204 may be removed when a user desires to utilize the jack or leg engagement feature 219.

Figure 4B:
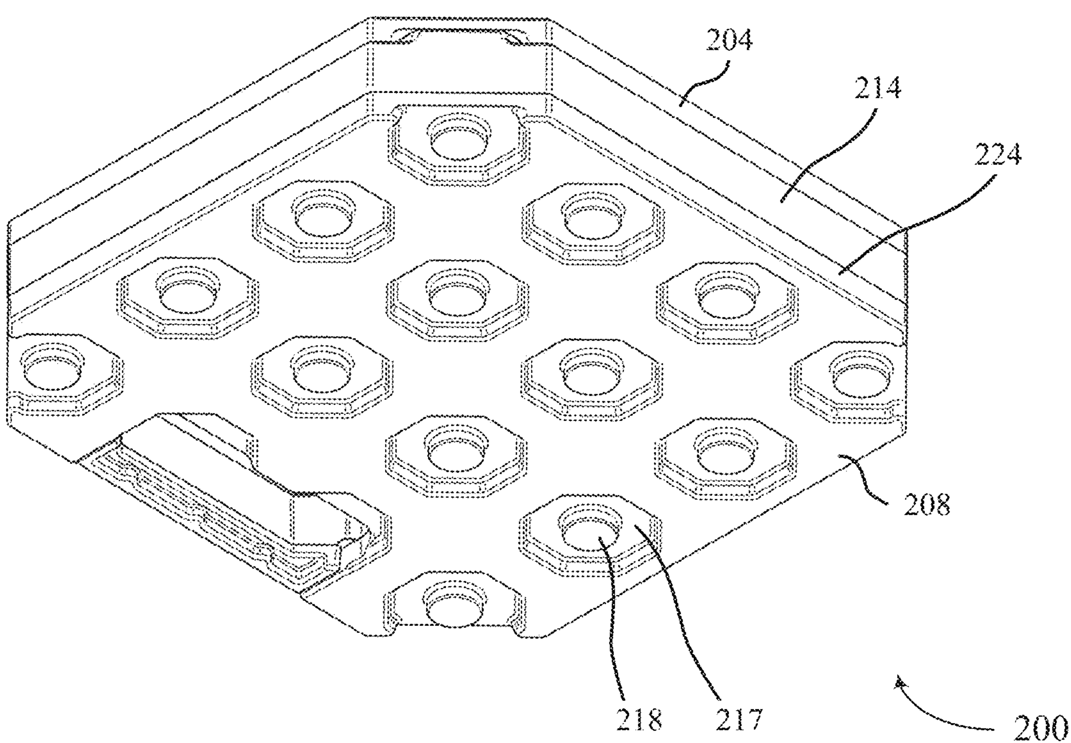
FIG. 4B illustrates a bottom perspective view of the load pad of FIGS. 1-3.

Turning now to FIG. 4B, the base apparatus 224 may have a bottom surface 208 and may additionally have a series of bottom engagement features 217. As can be seen when comparing FIGS. 3 and 4B, in some examples, the bottom engagement features 217 may be formed as a concavity that correspond with (i.e., may be the reverse of and can receive) one of the protrusions 215 of the center apparatus 214. Similarly, the bottom engagement features 217 may have a central protrusion 218 that corresponds with (i.e., are the protrusions that would fit-within) the concave center portion 216 of the center apparatus 214. The aforementioned features allow for at least a portion of the base apparatus 224 of first a first load pad (e.g., any one of load pads 200*a*, 200*b*, and/or 200*c* in FIGS. 5 and 6) to engage with or otherwise interlock with at least a portion of the center apparatus 214 of a second load pad (e.g., any other of load pads 200*a*, 200*b*, and/or 200*c* in FIGS. 5 and 6). The bottom engagement features 217 and the central protrusion 218 may be dimensioned or otherwise sized to provide a slip fit or interference fit with the protrusions 215 and/or the concave center portion 216 of the center apparatus 214. It is noted that while a single bottom engagement features 217 and central protrusion 218 is referenced in FIG. 4B, the base apparatus 224 may have multiple bottom engagement features 217 and central protrusion 218. In one example, the number of bottom engagement features 217 may match the number of protrusions 215 of the center apparatus 214. The example of FIG. 4B includes sixteen (16) engagement features. It is noted that more or less engagement features may be implemented without departing from the scope of the disclosure. For example, the base apparatus 224 may include anywhere from one (1) to sixty (60) engagement features. In another example, the base apparatus 224 may include anywhere from eight (8) to twenty-eight (28) engagement features.

As described in further detail with respect to FIGS. 5 and 6 below, the bottom engagement features 217 may allow the load pad 200 to be used alone or multiple load pads 200 to be stacked in various configurations to increase the footing size and/or to increase the height of the system.

The base apparatus 224 may further include a handle portion 206*c*, which may for example be an opening that corresponds with similarly shaped openings in the top apparatus 204 and the center apparatus 214.

As noted above, the top apparatus 204 may have a top surface 202, which may be substantially flat or planar for supporting a load (e.g., a jack, a leg, a support, a vehicle wheel, or the like). The top surface 202 may have a texture or other surface irregularities that provide for a non-slip or increased friction surface or the like. While hidden from view in the Figures, the top apparatus 204 may include bottom engagement features that share features with, are similar to, or are identical to the bottom engagement features 217 of the base apparatus 224 described above with respect to FIG. 4B. Thus, the top apparatus 204 may be removably connectable to the center apparatus 214 to allow a user to either configure the load pad 200 with a flat or planar surface (i.e., with the top apparatus 204 installed to the center apparatus 214) or allow a user to remove the top apparatus 204 to allow for stacking of multiple load pads as described in further detail below with respect to FIGS. 5 and 6.

The series of bottom engagement features of the top apparatus 204 may be formed as a concavity that corresponds with (i.e., may be the reverse of and can receive) one of the protrusions 215 of the center apparatus 214. Similarly, the bottom engagement features may have a central protrusion that corresponds with (i.e., are the protrusions that would fit-within) the concave center portion 216 of the center apparatus 214. The bottom engagement features and central protrusion may be dimensioned or otherwise sized to provide a slip fit or interference fit with the protrusions 215 and/or the concave center portion 216 of the center apparatus 214. In one example, the number of bottom engagement features of the top apparatus 204 may match the number of protrusions 215 of the center apparatus 214. In one example, the top apparatus 204 may have sixteen (16) engagement features. It is noted that more or less engagement features may be implemented without departing from the scope of the disclosure. For example, the top apparatus 204 may include anywhere from four (4) to sixty (60) engagement features. In another example, the top apparatus 204 may include anywhere from eight (8) to twenty-eight (28) engagement features. In one aspect of the disclosure, the side walls of each engagement feature may be arranged in a generally octagonal configuration. However, it will be appreciated by those skilled in the art that other shapes such as for example, circular, oval, square, rectangular, hexagonal, heptagonal, nonagonal, decagonal, and the like, are included within the scope of the disclosure.

The top apparatus 204 may further include a handle portion 206*a,* which may for example be an opening that corresponds with similarly shaped openings in the center apparatus 214 and/or the base apparatus 224.

Figure 5:
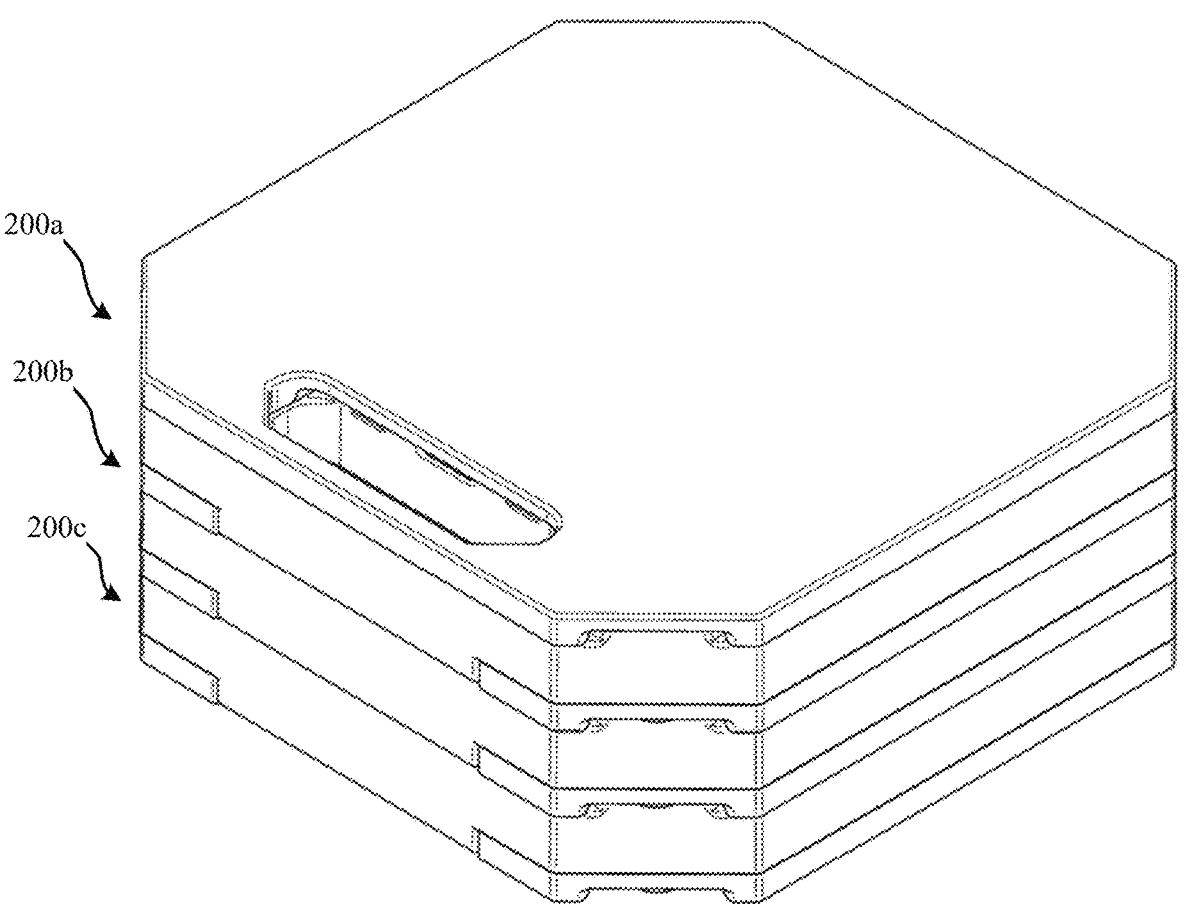
FIG. 5 illustrates a perspective view one example configuration of multiple load pads according to aspects of the disclosure.
Figure 6:
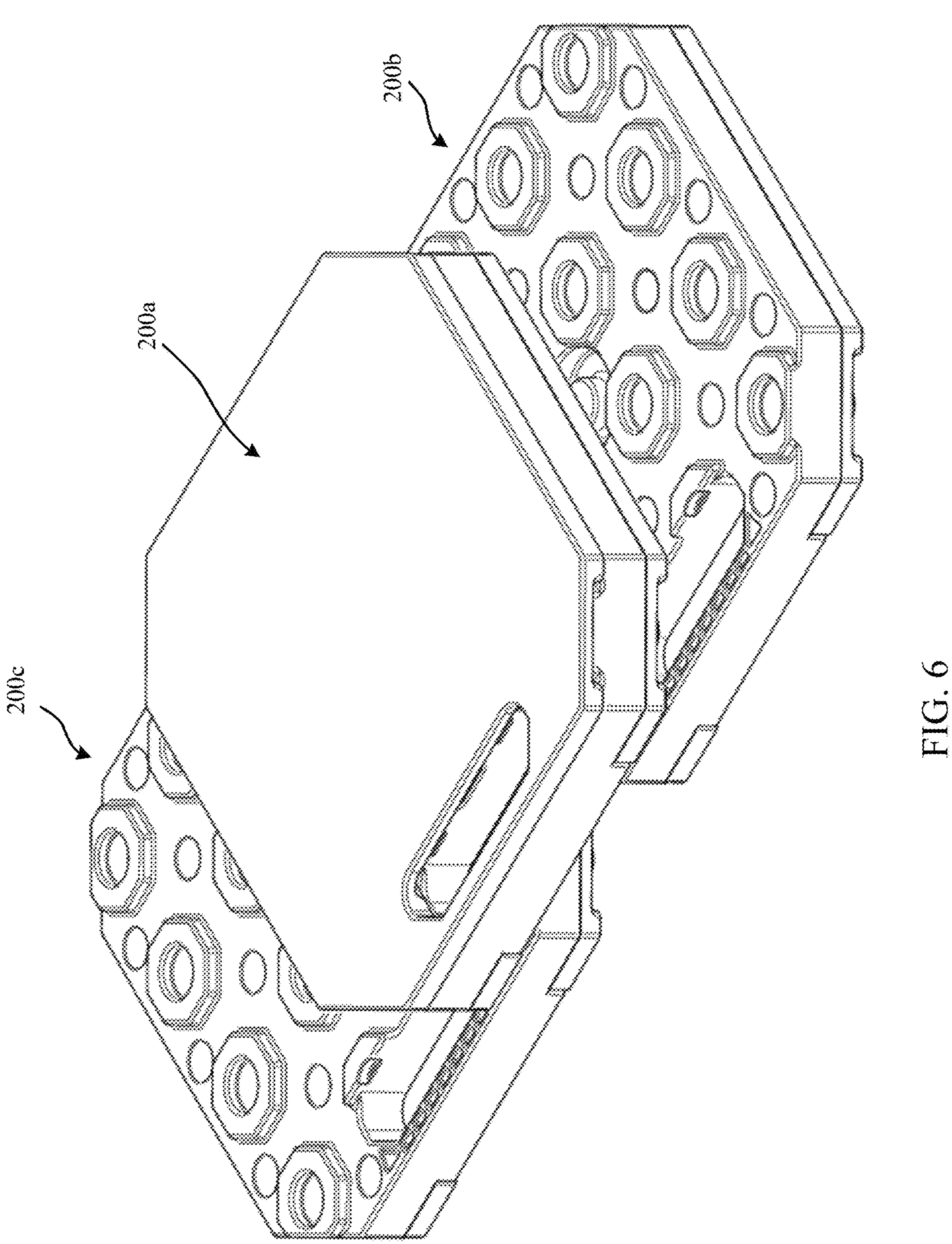
FIG. 6 illustrates a perspective view of another example configuration of multiple load pads according to aspects of the disclosure.

FIGS. 5 and 6 show examples of multiple load pads 200 used in various configurations. As shown in FIG. 5, if a user wishes to stack two or more of the load pads 200. The top apparatus (e.g., 204 described above with respect to FIGS. 1-3 and 4B) can be removed from a bottom-most load pad 200*c*. Removing the top apparatus exposes the protrusions (e.g., protrusions 215 described above with respect to FIG. 3) and allows for the protrusions to engage with the bottom engagement features (e.g., bottom engagement features 217 described above with respect to FIG. 4B) of a second load pad 200*b* that is to be placed on top of the bottom-most load pad 200*c*. Similarly, if a user wishes to stack another load pad on top of the second load pad 200*b,* the user removes the top apparatus (e.g., 204 described above with respect to FIGS. 1-3 and 4B) exposing the protrusions of the respective middle apparatus (e.g., protrusions 215 described above with respect to FIG. 3) and allows for the protrusions to engage with the bottom engagement features (e.g., bottom engagement features 217 described above with respect to FIG. 4B) of a third load pad 200*a* that is to be placed on top of the second load pad 200*b*.

FIG. 6, shows another example use of multiple load pads. Similarly to the aspects described above, the top apparatus (e.g., 204 described above with respect to FIGS. 1-3 and 4B) may be removed from each of the load pads (e.g., load pads 200*b* and 200*c*) that user wishes to stack another load pad (e.g., load pad 200*a*) thereon, allowing for engagement of respective protrusions (e.g., protrusions 215 described above with respect to FIG. 3) and with the bottom engagement features (e.g., bottom engagement features 217 described above with respect to FIG. 4B), and thus increasing stability of the overall system.

While in each of FIGS. 5 and 6, the top apparatus (e.g., 204 described above with respect to FIGS. 1-3 and 4B) of the top-most load pad 200*a* is shown installed, in some instances (e.g., when a user wishes to stabilize a jack or other support 700 as described above with respect to FIG. 7) the top apparatus of the top-most load pad 200*a* may be removed as well.

Aspects of the disclosure further relate to a system of more than one load pad 200. For example, two or more load pads may come a kit or set to allow for additional versatility. In some examples, the system may include instructions or examples (e.g., explanations of the various stacking configurations shown in FIGS. 6 and 7), printed on the packaging for example, and/or may include a link or QR code to digital content that provide examples, instructions and/or video(s). In some examples, any one of or all the components may be sold separately or may be sold as spare parts or as replacement parts.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A load pad for distributing a load, the load pad comprising:

a top apparatus formed of an elastomer with a substantially flat upper surface and a bottom surface with a series of top apparatus engagement features, the top apparatus engagement features comprising a concave portion;

a center apparatus configured to removably connect to a bottom surface of the top apparatus via a series of center apparatus engagement features, the center apparatus engagement features comprising a protrusion that is configured to fit-within the concave portion; and a bottom apparatus formed of an elastomer and connected to the center apparatus, wherein the center apparatus is formed of a material that has a higher rigidity than the top apparatus and the bottom apparatus.

2. The load pad of claim 1, wherein the bottom apparatus is removably connected to the center apparatus.

3. The load pad of claim 1, further comprising a handle opening passing through the top apparatus, the center apparatus, and the bottom apparatus.

4. The load pad of claim 1, wherein the bottom apparatus comprises a series of bottom apparatus engagement features, wherein the bottom apparatus engagement features are configured to be engagingly connectable with the center apparatus engagement features.

5. The load pad of claim 4, wherein:

the bottom apparatus engagement features comprise a bottom apparatus concave portion and the protrusion is configured to fit-within the bottom apparatus concave portion.

6. The load pad of claim 5, wherein the protrusion is octagonal shaped with a center concave portion.

7. The load pad of claim 1, wherein the bottom apparatus is removably connected to the center apparatus via a plurality of engagement protrusions.

8. The load pad of claim 7, wherein the plurality of engagement protrusions protrude from a top surface of the bottom apparatus and wherein the plurality of engagement protrusions are configured to be captively engaged with corresponding engagement openings of the center apparatus.

9. The load pad of claim 1, wherein the center apparatus is formed of at least one of a Polycarbonate, ABS Plastic, High Density Polyethylene (HDPE), or Polypropylene.

10. A load pad system comprising a plurality of load pads, wherein each load pad of the plurality of load pads comprises:

a top apparatus formed of an elastomer with a substantially flat upper surface and a bottom surface with a series of top engagement features;

a center apparatus configured to removably connect to a bottom surface of the top apparatus via a series of center apparatus engagement features; and a bottom apparatus formed of an elastomer and connected to the center apparatus, wherein the center apparatus is formed of a material that has a higher rigidity than the top apparatus and the bottom apparatus, wherein the series of center apparatus engagement features of a first load pad are configured to engage with a series of bottom engagement features of a second load pad when the second load pad is offset with respect to the first load pad.

11. A load pad system comprising a plurality of load pads, wherein each load pad of the plurality of load pads comprises:

a top apparatus formed of an elastomer with a substantially flat upper surface and a bottom surface with a series of top engagement features;

a center apparatus configured to removably connect to a bottom surface of the top apparatus via a series of center apparatus engagement features; and a bottom apparatus formed of an elastomer and connected to the center apparatus, wherein the center apparatus is formed of a material that has a higher rigidity than the top apparatus and the bottom apparatus, wherein the series of center apparatus engagement features of a first load pad are configured to engage with a series of bottom engagement features of a second load pad when the second load pad is aligned with respect to the first load pad.

12. The load pad system of claim 11, wherein the center apparatus of each load pad is formed of at least one of a Polycarbonate, ABS Plastic, High Density Polyethylene (HDPE), or Polypropylene.

* * * * *